(12) United States Patent
Romier et al.

(10) Patent No.: US 7,114,843 B2
(45) Date of Patent: Oct. 3, 2006

(54) METHOD OF MANUFACTURING A BITUMINOUS COATED AGGREGATE MIX

(75) Inventors: Alain Romier, St Germain les Arpajon (FR); Yves Martineau, Versailles (FR); Jacques David, Paris (FR); Maurice Audeon, Le Plessis-Grohan (FR)

(73) Assignee: HTP EST, Livry-sur-Sein (FR)

( * ) Notice: Subject to any disclaimer, the term of this patent is extended or adjusted under 35 U.S.C. 154(b) by 94 days.

(21) Appl. No.: 10/624,023

(22) Filed: Jul. 21, 2003

(65) Prior Publication Data

US 2005/0018530 A1    Jan. 27, 2005

(51) Int. Cl.
*B28C 7/04* (2006.01)

(52) U.S. Cl. .................. 366/4; 366/7; 366/22

(58) Field of Classification Search .............. 366/4, 366/6, 7, 8, 22, 23, 24, 25
See application file for complete search history.

(56) References Cited

U.S. PATENT DOCUMENTS

| | | | | |
|---|---|---|---|---|
| 1,656,001 A | * | 1/1928 | Johnson | 366/8 |
| 1,724,687 A | * | 8/1929 | Stansbury | 366/7 |
| 1,791,109 A | * | 2/1931 | Wittenberg | 366/7 |
| 2,917,395 A | | 12/1959 | Csanyi | 106/122 |
| 3,300,193 A | * | 1/1967 | Badgett | 366/8 |
| 3,482,824 A | * | 12/1969 | Lehman et al. | 366/7 |
| 3,554,498 A | * | 1/1971 | Laycock | 366/22 |
| 3,741,532 A | * | 6/1973 | Farnham et al. | 366/141 |
| 3,986,889 A | * | 10/1976 | Muntzer et al. | 366/22 |
| 4,089,508 A | * | 5/1978 | Anderson | 366/7 |
| 4,089,509 A | * | 5/1978 | Morton et al. | 366/8 |
| 4,218,145 A | * | 8/1980 | Brock et al. | 366/8 |
| 4,222,498 A | * | 9/1980 | Brock | 366/8 |
| 4,464,285 A | | 8/1984 | Schilling | 252/311.5 |
| 4,468,125 A | * | 8/1984 | Ohlson | 366/8 |
| 4,579,458 A | * | 4/1986 | Ohlson | 366/8 |
| RE32,206 E | * | 7/1986 | Bracegirdle | 366/7 |
| 4,795,263 A | * | 1/1989 | Kaga | 366/8 |
| 5,352,275 A | * | 10/1994 | Nath et al. | 95/117 |
| 5,452,213 A | * | 9/1995 | Ito et al. | 366/8 |
| 5,590,976 A | * | 1/1997 | Kilheffer et al. | 404/72 |
| 5,944,885 A | | 8/1999 | Yoshinaka et al. | 106/281.1 |
| 6,042,258 A | * | 3/2000 | Hines et al. | 366/8 |

FOREIGN PATENT DOCUMENTS

| | | |
|---|---|---|
| DE | 1 594 811 | 7/1970 |
| EP | 0 466 526 | 1/1992 |
| EP | 0 524 031 | 1/1993 |
| EP | 0 552 574 | 7/1993 |
| EP | 2 689 051 | 10/1993 |
| EP | 0 781 887 | 12/1996 |
| FR | 2 119 981 | 12/1971 |
| FR | 2117156 | 6/1972 |

(Continued)

OTHER PUBLICATIONS

Preliminary International Search Report dated Oct. 1, 2003; Application No. FR 0304876.

*Primary Examiner*—Tony G. Soohoo
(74) *Attorney, Agent, or Firm*—McCracken & Frank LLP

(57) ABSTRACT

A method of manufacturing a bituminous coated aggregate mix, said method comprising at least the following steps:
  (a) course aggregate are dried by heating;
  (b) an intermediate mix is formed by coating the course aggregate with hot bitumen; and
  (c) wet sand is mixed with the intermediate mix obtained in step (b).

25 Claims, 1 Drawing Sheet

FOREIGN PATENT DOCUMENTS

| | | |
|---|---|---|
| FR | 2 526 675 | 8/1984 |
| FR | 2553125 | 4/1985 |
| FR | 2 612 533 | 9/1988 |
| FR | 2 678 653 | 1/1993 |
| FR | 2689051 | 10/1993 |
| FR | 2 705 699 | 12/1994 |
| FR | 2 794 468 | 12/2000 |
| FR | 2 810 663 | 12/2001 |
| GB | 430979 | 6/1935 |
| GB | 1 378 386 | 12/1974 |
| WO | WO 84/02709 | 7/1984 |
| WO | WO 95/22661 | 8/1995 |
| WO | WO 96/04427 | 2/1996 |
| WO | WO 99/51677 | 10/1999 |
| WO | WO 02/16499 A1 | 7/2001 |

\* cited by examiner

US 7,114,843 B2

METHOD OF MANUFACTURING A BITUMINOUS COATED AGGREGATE MIX

FIELD OF THE INVENTION

The present invention relates to methods of manufacturing bituminous coated aggregate mixes.

More particularly, the invention relates to a method of manufacturing a bituminous coated aggregate mix comprising aggregate coated with bitumen, said method comprising at least the following steps:

(a) at least some of the aggregate is dried by heating;

(b) an intermediate mix is formed by coating a first portion of the aggregate that has substantially no fines with hot bitumen; and (c) a second portion of the aggregate that comprises sand and fines is mixed with the intermediate mix obtained at step (b).

BACKGROUND OF THE INVENTION

Document U.S. Pat. No. 3,868,262 describes an example of such a method in which all of the aggregate is heated during step (a), which requires a large amount of energy to be used because the initial aggregate mix contains a large quantity of water. In addition, the drying and the temperature being raised result in a large quantity of flue gasses being given off that contain water vapor laden with dust. In view of their large quantity, those flue gases are difficult to treat, and implementing methods of that type therefore gives rise to non-negligible pollution for the environment.

OBJECTS AND SUMMARY OF THE INVENTION

A particular object of the present invention is to mitigate those drawbacks.

To this end, according to the invention, in a method of the type in question, during step (a), only said first portion of the aggregate is heated, and, during step (c), the second portion of the aggregate that is mixed with the intermediate mix, is constituted by wet aggregate.

By means of these provisions, it is no longer necessary to dry the aggregate that contains fines, and that is contained in the second portion of the aggregate.

On the contrary, only course aggregate, and optionally sand with no fines, are dried. They are lightly laden with water (the first portion of the aggregate is generally 2 to 3 times less laden with water than the second portion), they are easier to dry than aggregate containing fines, and they do not generate much dust, so that the energy consumption and the flue gas emissions during heating are reduced considerably.

In addition, the relatively small volume of flue gases produced during drying makes it possible for said flue gases to be treated more effectively, thereby very significantly reducing the pollution of the environment.

Finally, the method of the invention also makes it possible to use installations that are smaller and less costly than in the prior art. The drier that heats the aggregate can be much smaller than in the prior art, as can the scrubber installation for scrubbing the flue gases coming from the drier.

In preferred implementations of the invention, it is optionally possible to use any of the following provisions:

during step (a), the first portion of the aggregate is heated to a temperature of not less than 100° C.;

during step (c), the second portion of the aggregate, which is mixed with the intermediate mix, is constituted by aggregate at ambient temperature;

the first portion of the aggregate comprises course aggregate (aggregate of particle size generally lying in the range 4 millimeters (mm) to 20 mm), whereas the second portion of the aggregate comprises sand (aggregate of particle size generally smaller than 4 mm) and fines only;

the first portion of the aggregate further comprises sand having a particle size greater than 2 mm;

the second portion of the aggregate represents in the range 15% by weight of the aggregate to 75% by weight of the aggregate;

the second portion of the aggregate has a water content lying in the range 2% by weight to 5% by weight, and preferably about 3.5% by weight, before it is mixed with said intermediate mix;

during step (a), the first portion of the aggregate is heated to a temperature lying in the range 100° C. to 160° C., and preferably in the range 110° C. to 130° C., and said temperature is such that, after step (c), the coated aggregate mix is at a temperature lying in the range 60° C. to 100° C., thereby making it possible to obtain a warm or semi-warm coated aggregate mix that is easy to use, without requiring the complex installations that are required in the prior art for obtaining bitumen foam; in addition, in this implementation, because of the relatively low temperature of the coated aggregate mix obtained, volatile organic compound (VOC) emissions, which are harmful to the environment, are reduced considerably;

during step (c), a quantity of water is added to the mix, which quantity of water is sufficient for said water to vaporize in part, and to cause the bitumen to expand;

during step (c), a quantity of water (constituted by the water contained in the second portion of the aggregate, plus any water added during mixing) is added to the mix, which quantity of water is sufficient for water to remain in the bituminous coated aggregate mix after step (c): this water forms a water-in-oil emulsion with the bitumen that makes it possible to improve the workability of the coated aggregate mix at low temperature;

during step (a), the first portion of the aggregate is heated to a temperature lying in the range 180° C. to 220° C., and preferably about 200° C., and said temperature of the first portion of the aggregate is such that, after step (c), the coated aggregate mix is at a temperature lying in the range 100° C. to 150° C., and preferably about 130° C.; and all of the bitumen that enters into the composition of the bituminous coated aggregate mix is added to the mix during step (b).

BRIEF DESCRIPTION OF THE DRAWINGS

Other characteristics and advantages of the invention appear from the following description of one of its implementations, given by way of non-limiting example, and with reference to the accompanying drawing.

In the drawing.

MORE DETAILED DESCRIPTION

Figure 1:
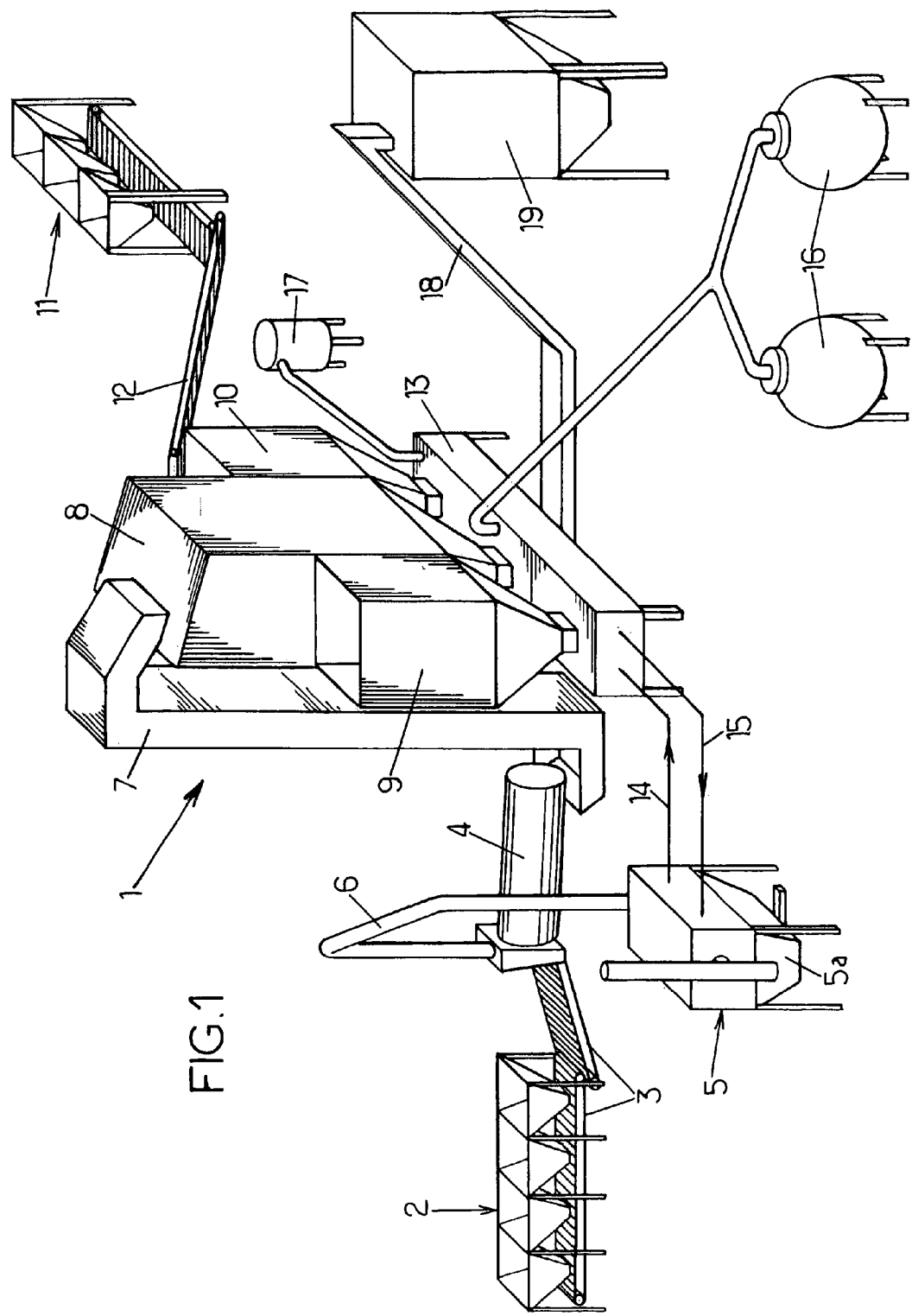
FIG. 1 is a summary diagram showing apparatus suitable for implementing a method of the invention.

The purpose of the method of the invention is to manufacture a bituminous coated aggregate mix comprising aggregate coated with bitumen.

The aggregate, which forms the mineral skeleton of the coated aggregate mix, itself comprises:

fines, e.g. having a particle size of less than or equal to 80 micrometers (μm);

sand, e.g. having a particle size of less than 4 mm, and containing a certain quantity of particles of size less than 63 μm; and course aggregate, e.g. having a particle size lying in the range 4 mm to 20 mm.

All of these aggregates can be obtained either from natural minerals or from recycled materials (containing natural or artificial aggregates and binders, e.g. recycled bituminous coated aggregate mixes).

In order to obtain a given weight E of bituminous coated aggregate mix, use is made of a weight G of course aggregate, a weight S of sand and fines, and a weight B of bitumen, where E is substantially equal to G+S+B.

As shown very diagrammatically in FIG. 1, the method of the invention may be implemented in a stationary or moving coating plant 1 that is either in a stationary position remote from the spreading site, or that moves on the spreading site, and which may, for example, be of the discontinuous type as in the example shown, or of the continuous type (not shown).

This coating plant 1 may, for example, include aggregate storage hoppers 2 in which a first portion of the aggregate that enters into the composition of the bituminous coated aggregate mix is stored. Said first portion of the aggregate has no fines, and, for example, includes all of the course aggregate G and optionally a portion of the sand that enters into the composition of the coated aggregate mix to be manufactured (in particular coarse sand without any fines, of particle size lying in the range 2 mm to 4 mm, for example). Said first portion of the aggregate may, for example, represent in the range 25% of the total weight of the aggregate G+S to 80% of said total weight, and advantageously in the range 50% of said total weight to 75% of said total weight.

For example, the first portion of the aggregate has a water content by weight of less than 2.5% (since the first portion of the aggregate is generally constituted by a mix of aggregates having different particle sizes and stored in different hoppers, this is the mean water content by weight of the mix).

A conveyor device 3 collects the aggregate of said first portion of aggregate at the outlets of the hoppers 2 (for example, the conveyor device may be made up of one or more conveyor belts and/or bucket elevators and/or other conveyor devices), and conveys it to a drier 4.

In order to remove substantially all of the water contained in the first portion of the aggregate, the drier 4 heats said first portion of aggregate to a temperature which, in all of the implementations of the invention, is greater than 100° C., generally lies in the range 110° C. to 220° C., and advantageously lies in the range 120° C. to 200° C. Since the first portion of aggregate has no fines, the drying operation is easy to implement and merely requires a drier that is of relatively low power, and that does not consume much energy.

The flue gases emitted by the drier 4 are emitted in a relatively small quantity and are relatively lightly laden with dust due to the absence of fines in the first portion of the aggregate. Said flue gases are collected via a duct 6 that conveys them to a scrubber and/or condenser assembly 5. This assembly 5 may optionally include a fines collector in which the dust separated from the flue gases is collected.

After being dried in the drier, the aggregate of the first portion of aggregate is delivered, for example, to an elevator 7 (of the bucket type or of some other type) which conveys the aggregate to the top of an intermediate storage hopper 8.

In addition, fines may be stored in a fines storage silo 9. The fines stored in the silo 9 may, in particular, include the dust collected in the fines collector 5a of the condenser/scrubber assembly 5, as well as other fines.

In addition, a second portion of the aggregate, e.g. representing in the range 15% of the total weight of the aggregate to 75% of said total weight, and advantageously in the range 25% of said total weight to 50% of said total weight, is stored in an intermediate storage hopper 10. Said second portion of the aggregate includes wet sand and fines (or else a crushed recycled coated aggregate mix) at ambient temperature, and said second portion of the aggregate is received by the hopper 10 from hoppers for storing wet sand 11, via a conveyor device 12, e.g. comprising conveyor belts and/or bucket elevators or the like. For example, the second portion of the aggregate may have a water content by weight lying in the range 2% to 5%, and advantageously about 3.5%.

The hoppers 8, 9, 10 feed a mixer 13 or some other mixing device serving to form the bituminous coated aggregate mix.

The mixer 13 may, for example, be of the double-walled type so as to be heated by steam flowing between the two walls. To this end, a duct 14 may be provided for conveying steam from the condenser/scrubber assembly 5 to the cavity between the two walls of the mixer 13, which steam is then returned to the condenser/scrubber assembly 5 via another duct 15.

The mixer 13 is also connected to a storage facility 16 for storing hot bitumen, which storage facility is associated with a metering system so that it is possible to add hot bitumen in fluid form to the mixer. The bitumen is preferably maintained at its temperature of use (depending on the grade of the bitumen and lying, for example, approximately in the range 140° C. to 180° C.) in the storage facility 16. The bitumen in question may optionally be doped with additives such as surface-active agents so as to facilitate both cohabitation with water and also expansion of the binder, and so as to improve the adhesiveness of said binder on the mineral skeleton. Hygroscopic additives may also be finely dispersed in the bitumen in order to facilitate inserting the water into the bitumen and distributing it uniformly therein during the coating operations explained below.

Finally, the mixer 13 may also optionally be connected to:

a water storage facility 17 associated with a metering system so that it is possible, if necessary, to add water (optionally containing a surface-active agent or some other additive) to said mixer, e.g. by means of a sprinkler boom (not shown); and/or to means (not shown) for adding various additives to the coated aggregate mix being prepared.

In order to form the desired bituminous coated aggregate mix, initially an intermediate mix is formed in the mixer 13, which intermediate mix comprises the first portion of the aggregate (coming from hopper 9) and the total weight of bitumen B (coming from the storage facility 16) that enters into the composition of the mass E of coated aggregate mix to be obtained. During this initial mixing, it is possible firstly to feed the following into the mixer: either the bitumen (optionally and simultaneously with water), or the first portion of the aggregate (then followed by the bitumen, and optionally water).

During the mixing, the hot and dry aggregate of the first portion of aggregate is fully coated with a thick film of bitumen which adheres securely to said aggregate.

The initial mixing is continued for a time (e.g. less than 2 minutes) sufficient to obtain full coating of the course aggregate and sand making up the first portion of aggregate.

The second portion of aggregate, coming from hopper 10, is then added to the resulting intermediate mix, and is mixed therewith for a few minutes, e.g. about 2 minutes.

At the beginning of this final mixing, the second portion of the aggregate is heated suddenly by heat transfer with the intermediate mix, which heat transfer is facilitated by the thermal bridge constituted by the bitumen coating the first portion of the aggregate.

As a result, at least a portion of the water contained in the second portion of the aggregate is vaporized, and the temperatures of the aggregates are balanced, with the mix then having a uniform temperature.

Additives, e.g. lime, or additional fines from hopper 9, may optionally also be added to the mixer 5.

In a first implementation of the invention, the initial temperature of the first portion of the aggregate may lie in the range 100° C. to 160° C., and preferably in the range 110° C. to 130° C. at the outlet of the drier 4, and this temperature is chosen so that the bituminous coated aggregate mix obtained after mixing in the mixer 5 is at a temperature lying in the range 50° C. to 100° C., and preferably in the range 60° C. to 100° C.

By way of example, for a mix containing 66% of course aggregate and 33% of sand and fines, by heating the course aggregate alone to 150° in the drier, a final coated aggregate mix temperature of in the range 95° C. to 100° C. is obtained after one minute of mixing.

In this first implementation, a portion of the water contained in the second portion of the aggregate is not evaporated when the initial contact takes place between the first and second portions of the aggregate (it can be necessary to add water to the mixer 13 during the final mixing, if the water content of the second portion of the aggregate is insufficient), thereby enabling the bitumen to expand. Self-expansion of the bitumen is thus generated without having to use any special means, unlike the foaming methods of the prior art.

Due to this expansion, the sand particles and fines in the second portion of the aggregate are fully coated with the bitumen.

The resulting warm or semi-warm coated aggregate mix is easy to use in spite of its relatively low temperature. This implementation offers the advantage of strongly limiting emissions of organic substances, and in particular volatile organic compounds (VOCs) and polycyclic aromatic hydrocarbons (PAHs) that are harmful to human health.

Additives, e.g. lime (quick lime or hydrated lime) or additional fines coming from hopper 9 may optionally also be added to the mixer 5.

In addition, an additional quantity of water, optionally with added surface-active agents, may optionally be added to the mix towards the end of mixing. The water forms an emulsion in the bitumen, and improves the subsequent workability of the coated aggregate mix. A water-oil type emulsion is thus created, and said emulsion of water in the bitumen guarantees good workability in spite of the coated aggregate mix having a very low temperature.

In a second implementation of the invention, the first portion of the aggregate heated in the drier 4 is heated to a temperature lying in the range 180° C. to 220° C., and preferably about 200° C., and said temperature is chosen so that the final temperature of the coated aggregate mix after mixing in the mixer 5 lies in the range 100° C. to 150° C., and is advantageously about 130° C.

In said second implementation, the high temperature of the first portion of the aggregate causes sudden evaporation of the water, which does not enable the bitumen to undergo self-expansion, and a conventional coated aggregate mix is thus obtained, at a moderate temperature, which also limits the organic compound emissions. In said second implementation, it may be advantageous to add water, optionally with added surface-active agents, to the mixer 5, at the end of mixing of the coated aggregate mix: subsequent use of the coated aggregate mix is thus facilitated by making it more malleable.

In all of the implementations of the invention, it should be noted that a single bituminous binder is used in the coated aggregate mix. In addition, it should also be noted that the coated aggregate mix that is obtained has its rated mechanical characteristics as soon as it is used, without it being necessary to wait for a curing period before such performance levels are reached.

In both of the implementations of the invention, once mixing is finished, the weight E of the bituminous coated aggregate mix is transferred by a conveyor device 18 to a storage hopper 19 for storing the coated aggregate mix, which hopper is adapted for loading the bituminous coated aggregate mix into trucks or other plant.

The final characteristics of some examples of bituminous coated aggregate mixes obtained by using the first implementation of the method of the invention are given below.

EXAMPLE 1

Aggregate of particle size 0 mm to 10 mm (porphyry):
particles passing through a 4 mm screen: 40%
particles passing through a 0.08 mm screen: 9%
Bitumen grade: 70/100 0.5% doped with an "L200/240P" mix (CECA®)
Binder content: 5.37 parts per hundred (p.p.h.)
Duriez voids percentage=8.2%
R=5.6 megapascals (Mpa)
r/R=0.9
Residual water content: <0.2%

(where R is the Duriez resistance when dry and at 18°, and r is the Duriez resistance after immersion at 18°, r/R being the immersion/compression resistance in compliance with EEC Standard No. 98 251 1).

EXAMPLE 2

Aggregate of particle size 0 mm to 10 mm (porphyry):
particles passing through a 4 mm screen: 40%
particles passing through a 0.08 mm screen: 9%
Bitumen grade: 50/70 0.2% doped with "Wetfix" (AKZO®)
Binder content: 5.42 p.p.h.
Duriez voids percentage=9.2%
R=6.6 Mpa
r/R=0.8

EXAMPLE 3

Aggregate of particle size 0 mm to 10 mm, containing 40% of recycled coated aggregate mixes (recyclate):
particles passing through a 4 mm screen: 35%
particles passing through a 0.08 mm
screen: 8.5%
Bitumen grade: 50/70 0.8% doped with "Wetfix" (AKZO®)

Total binder content: 5.3 p.p.h.
R=6.2 Mpa
Duriez voids percentage=10.3%

What is claimed is:

1. A method of manufacturing a bituminous coated aggregate mix comprising aggregate coated with bitumen, said aggregate itself comprising fine aggregate and coarse aggregate lying in the range 4 mm to 20 mm, said method comprising at least the following steps:
   (a) drying a first portion of the aggregate that has substantially no fines by heating to a temperature which is not less than 100° C.,
   (b) an intermediate mix is formed by coating said first portion of the aggregate with hot bitumen; and
   (c) mixing a second portion of the aggregate that comprises sand and fines that is wet and unheated with the intermediate mix obtained at step (b), thereby obtaining said bituminous coated aggregate mix at a temperature lying in the range 60° C. to 100° C., and whereby at least part of the water contained in the second portion of the aggregate is vaporized during said step (c) and causes the bitumen to expand.

2. A method according to claim 1, in which, during step (c), the second portion of the aggregate, which is mixed with the intermediate mix, is constituted by aggregate at ambient temperature.

3. A method according to claim 1, wherein the second portion of the aggregate comprises sand and fines only.

4. A method according to claim 1, in which the first portion of the aggregate further comprises sand having a particle size greater than 2 mm.

5. A method according to claim 1, in which the second portion of the aggregate represents in the range 15% by weight of the aggregate to 75% by weight of the aggregate.

6. A method according to claim 1, in which the second portion of the aggregate has a water content lying in the range 2% by weight to 5% by weight, and preferably about 3.5% by weight, before it is mixed with said intermediate mix.

7. A method according to claim 1, in which, during step (a), the first portion of the aggregate is heated to a temperature lying in the range 100° C. to 160° C., and preferably in the range 110° C. to 130° C., and said temperature is such that, after step (c), the coated aggregate mix is at a temperature lying in the range 60° C. to 100° C.

8. A method according to claim 7, in which, during step (c), a quantity of water is added to the mix, which quantity of water is sufficient for said water to vaporize in part, and to cause the bitumen to expand.

9. A method according to claim 1, in which, during step (c), a quantity of water is added to the mix, which quantity of water is sufficient for water to remain in the bituminous coated aggregate mix after step (c).

10. A method according to claim 1, in which all of the bitumen that enters into the composition of the bituminous coated aggregate mix is added to the mix during step (b).

11. A method according to claim 1, wherein water remains in the bituminous coated aggregate mix after step (c).

12. A method of manufacturing a bituminous coated aggregate mix comprising aggregate coated with bitumen, said aggregate itself comprising fine aggregate and coarse aggregate lying in the range 4 mm to 20 mm, said method comprising the following steps:
    drying a first portion of the aggregate that has substantially no fines by heating to a temperature which is not less than 100° C.,
    mixing the first portion with a second portion of the aggregate and with hot bitumen, the second portion of the aggregate comprising sand and fines and being wet and unheated, thereby obtaining said bituminous coated aggregate mix at a temperature lying in the range 60° C. to 100° C., and whereby at least part of the water contained in the second portion of the aggregate is vaporized during said mixing and causes the bitumen to expand.

13. A method according to claim 12, in which the second portion of the aggregate is constituted by aggregate at ambient temperature.

14. A method according to claim 12, wherein the second portion of the aggregate comprises sand and fines only.

15. A method according to claim 12, in which the first portion of the aggregate further comprises sand having a particle size greater than 2 mm.

16. A method according to claim 12, in which the second portion of the aggregate represents in the range 15% by weight of the aggregate to 75% by weight of the aggregate.

17. A method according to claim 12, in which the second portion of the aggregate has a water content lying in the range 2% by weight to 5% by weight, and preferably about 3.5% by weight, before it is mixed with said first portion of the aggregate and said hot bitumen.

18. A method according to claim 12, in which the first portion of the aggregate is heated to a temperature lying in the range 100° C. to 160° C., and preferably in the range 110° C. to 130° C., and said temperature is such that, after mixing the first and second portions of the aggregate with the hot bitumen, the coated aggregate mix is at a temperature lying in the range 60° C. to 100° C.

19. A method according to claim 18, in which, a quantity of water is added during mixing the first and second portions of the aggregate with the hot bitumen, which quantity of water is sufficient for said water to vaporize in part, and to cause the bitumen to expand.

20. A method according to claim 12, in which a quantity of water is added during mixing the first and second portions of the aggregate with the hot bitumen, which quantity of water is sufficient for water to remain in the bituminous coated aggregate mix after mixing.

21. A method according to claim 12, wherein water remains in the bituminous coated aggregate mix after step (c).

22. A method of manufacturing a bituminous coated aggregate mix comprising aggregate coated with bitumen, said aggregate itself comprising fine aggregate and coarse aggregate lying in the range 4 mm to 20 mm, said method comprising at least the following steps:
    (a) drying a first portion of the aggregate that has substantially no fines by heating to a temperature which is in the range 180° C. to 220° C. and preferably about 200° C.,
    (b) an intermediate mix is formed by coating said first portion of the aggregate with hot bitumen; and
    (c) mixing a second portion of the aggregate that comprises sand and fines that is wet and unheated with the intermediate mix obtained at step (b), thereby obtaining said bituminous coated aggregate mix at a temperature lying in the range 100° C. to 150° C., and preferably about 130° C.

23. A method of manufacturing a bituminous coated aggregate mix comprising aggregate coated with bitumen, said aggregate itself comprising fine aggregate and coarse aggregate lying in the range 4 mm to 20 mm, said method comprising at least the following steps:

drying a first portion of the aggregate that has substantially no fines by heating to a temperature which is in the range 180° C. to 220° C. and preferably about 200° C., mixing the first portion with a second portion of the aggregate and with hot bitumen, the second portion of the aggregate comprising sand and fines and being wet and unheated, thereby obtaining said bituminous coated aggregate mix at a temperature lying in the range 100° C. to 150° C., and preferably about 130° C.

24. A method of manufacturing a bituminous coated aggregate mix comprising aggregate coated with bitumen, said aggregate itself comprising fine aggregate and coarse aggregate lying in the range 4 mm to 20 mm, said method comprising at least the following steps:

(a) drying a first portion of the aggregate including coarse aggregate by heating to a temperature which is not less than 100° C., (b) an intermediate mix is formed by coating said first portion of the aggregate with hot bitumen; and (c) mixing a second portion of the aggregate that comprises sand and fines that is wet and unheated with the intermediate mix obtained at step (b), thereby obtaining said bituminous coated aggregate mix at a temperature lying in the range 60° C. to 100° C., and whereby at least part of the water contained in the second portion of the aggregate is vaporized during said step (c) and causes the bitumen to expand.

25. A method of manufacturing a bituminous coated aggregate mix comprising aggregate coated with bitumen, said aggregate itself comprising fine aggregate and coarse aggregate lying in the range 4 mm to 20 mm, said method comprising at least the following steps:

drying a first portion of the aggregate including coarse aggregate by heating to a temperature which is not less than 100° C., mixing the first portion with a second portion of the aggregate and with hot bitumen, the second portion of the aggregate comprising sand and fines and being wet and unheated, thereby obtaining said bituminous coated aggregate mix at a temperature lying in the range 60° C. to 100° C., and whereby at least part of the water contained in the second portion of the aggregate is vaporized during said mixing and causes the bitumen to expand.

* * * * *